Inventor:
Heinz Heilmann
Klaus Frohmuller

United States Patent Office 3,561,833
Patented Feb. 9, 1971

3,561,833
MOTOR
Heinz Heilmann and Klaus Frohmüller, Oldenburg, Germany, assignors to Licentia Patent-Verwaltungs-G.m.b.H., Frankfurt, Germany
Filed Nov. 10, 1969, Ser. No. 875,147
Claims priority, application Germany, Nov. 10, 1968,
P 18 08 133.9
Int. Cl. H02k 1/02, 19/14
U.S. Cl. 310—46                             12 Claims

ABSTRACT OF THE DISCLOSURE

A low cost hysteresis motor having a rotor whose yoke is formed of one or more hollow cylinders of hysteretic material, the interiors of which are filled with a non-magnetic filler material provided with an axial bore to receive the rotor shaft. The exterior of the cylinders is enclosed by a lamination packet of layers of annular sheets of conventional dynamo sheet iron which supports a squirrel cage. At the ends of the rotor, the filler material is preferably formed to provide protrusions which serves as ventilation vanes.

BACKGROUND OF THE INVENTION

The present invention relates to synchronous motors and more particularly to a small synchronous motor having a rotor formed at least in part of hysteretic material and provided with a squirrel cage.

Hysteresis type synchronous motors having squirrel cages on their rotors are well known. In such a motor the use or arrangement of hysteretic material in the rotor results in a synchronous rotation in the motor, while the squirrel cage is provided to produce high asynchronous torques during the starting stage of the motor. Additionally, after the synchronous speed of the motor has been reached, the squirrel cage tends to dampen damaging rotor oscillations, caused for example, by intermittent loads.

One type or novel constructional arrangement of such a hysteresis motor wherein the above mentioned desired characteristics, i.e., synchronous speed, high starting torques, and dampened oscillations, are combined or provided in an advantageous manner is shown in pending U.S. patent application Ser. No. 769,308, by J. Ludemann and Heilmann and which is assigned to the same assignee as this application, filed Oct. 21, 1968. According to the teachings of this application, the motor has a rotor yoke, a major portion of which consists of hysteretic material. Directly surrounding the yoke on the surface thereof facing the air gap defined between the rotor and stator is a lamination packet comprised of conventional dynamo sheet iron which holds or supports the squirrel cage. With this arrangement, the useful magnetic flux flow through the rotor is substantially via a series connection of conventional dynamo sheet iron and hysteretic material. Flow of magnetic flux in a path parallel to this series connection and through only the dynamo sheet iron is substantially eliminated.

Although the novel hysteresis motor construction described above has many advantages over prior art constructions, as with most electrical devices it is desirable to construct or manufacture the motor as inexpensively as is possible without sacrificing the desired operating characteristics or the required structural characteristics.

SUMMARY OF THE INVENTION

Accordingly, it is the object of the present invention to construct the rotor of the above-described type of hysteresis motor in such a manner that it can be manufactured with the least amount of expensive raw materials and of hours of labor.

According to the present invention, the rotor of the hysteresis motor is provided with a rotor yoke formed of at least one and preferably a plurality of hollow cylinders consisting of hysteretic material. The interior of the cylinders is filled with a non-magnetic filler material while leaving an opening or axial bore for insertion of the rotor shaft. The cylinders are directly enclosed, on the surface facing the air gap resulting between the rotor and the stator of the motor, by a lamination packet consisting of layers of annular metal sheets of conventional dynamo sheet iron and into which a squirrel cage is cast.

According to other features of the invention, the individual components of the rotor are constructed so that they can be fastened together by an adhesive, and the filler material is formed so that protrusions are provided which extend beyond the ends of the rotor and serve as ventilation vanes.

DESCRIPTION OF THE PREFERRED EMBODIMENTS

Figure 1:
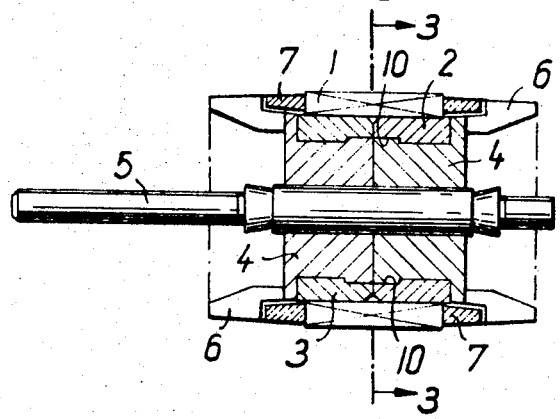
FIG. 1 is a sectional view of the preferred embodiment of the entire rotor.
Figure 3:
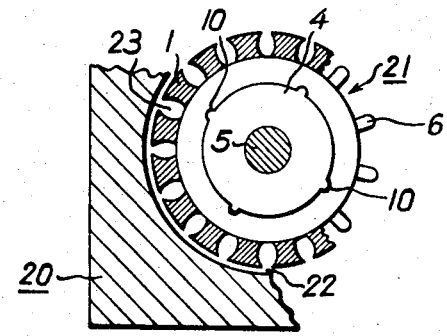
FIG. 3 is a partially cut away cross-sectional view of the preferred embodiment of the rotor taken along the plane 3—3 of FIG. 1 which has also been expanded to include a portion of the stator.

Referring now to the figures, and in particular FIGS. 1 and 3 there is shown a motor having a stator 20 and a rotor 21 relatively mounted to provide an air gap 22, therebetween. The rotor 21 is provided with a lamination packet 1 adjacent the air gap 22. The lamination packet 1 is comprised of layers of circular or annular metal sheets of conventional dynamo iron. Formed within the lamination packet 1 are a plurality of radial grooves 23, arranged in the form of a ring, for receiving and holding the winding rods (not shown) of the squirrel cage cast in the conventional manner for example, of aluminum. The shorting or end rings of the squirrel cage are indicated by the numeral 7 in FIG. 1. Preferably as indicated the grooves 23 are magnetically open both in the direction toward the air gap 22 and in the direction toward the yoke of the rotor. Obviously however, the grooves 23 may be magnetically open in one direction only. A more detailed description of the grooves is contained in the above-mentioned pending application.

Directly enclosed or surrounded by the lamination packet 1 is the yoke of the rotor 21 which, in the illustrated embodiment of the invention consists of two symmetrical hollow cylinders 2 and 3, made of hysteretic material. The interior of each of the hollow cylinders 2, 3 is filled with a solid non-magnetic filler material 4 leaving an axial bore 9 for the purpose of receiving the rotor shaft 5.

Figure 2:
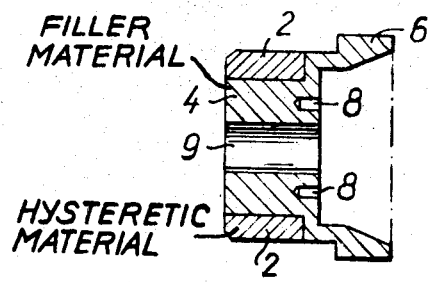
FIG. 2 is a sectional view of a portion of the rotor yoke.

As is most clearly shown in FIG. 2 each end or frontal face of the rotor 21, is provided with ventilation vanes 6. These vanes 6, in the preferred illustrated embodiment constitute a unitary structure with the filler material 4 and are constructed by providing the filler material 4 with protrusions which extend beyond one end or frontal face of each of the cylinders 2, 3 and are formed with the desired shape of the ventilation vanes. The filler material 4, at one or both ends of the rotor 21 is also provided with blind bore holes 8 for the purpose of receiving balancing weights for the rotor.

The inner wall or surface of each of the hollow cylinders 2, 3 is also provided with one or more axial grooves 10 (FIG. 3) which as shown in FIG. 1, preferably extend only along a portion of the length of each cylinder. When the interior of the cylinders 2, 3 are filled with the material 4, the grooves 10 are also filled and tend to aid in securing the filler material 4 to the cylinders 2, 3, both against rotation and displacement.

The rotor 21 is manufactured by separately prefabricating the lamination packet 1 and the rotor yoke. The radial grooves 23 of the lamination packet 1 are first opened only at one end, preferably in the direction toward the periphery of the packet, i.e., in the direction toward the air gap 22, and are closed off by means of a narrow bar in the direction toward the interior or yoke. After casting the winding rods (not shown) of the squirrel cage within the groves, the interior diameter of the lamination packet 1 is turned out or increased to a diameter sufficient to remove the bar, and thus magnetically open the grooves 23 in the second direction. This machining step does not result in any substantial increased expenditures in the manufacture of the rotor since the interior of the lamination packet 1 must be worked on in any case in order to insert the yoke. The lamination packet 1 may, of course, also be provided with grooves that open only in one direction, especially in the direction toward the yoke.

The hollow cylinders 2 and 3, consisting of hysteretic material are initially produced, preferably by means of a sintering process. The interior of each hollow cylinder 2 or 3 is then individually filled with the filler material 4 which is of the compressible or injection-moldable type. This filler material 4 preferably consists of a non-magnetic material whose casting temperature is sufficiently low that the magnetic properties of the hollow cylinders 2 and 3 are not adversely influenced during the casting operation. One type of filler material which has proven to be particularly advantageous for the intended purpose is a zinc alloy consisting of zinc, aluminum, and manganese, commonly referred to as "Zamak." However, the filler material may also be, for example, an insulating material, such as a glass fiber reinforced polymethylenoxide.

The individual components of the rotor are then all connected together, preferably in one operation by means of an adhesive such as, for example, an epoxide resin. The gap filled with adhesive between the lamination packet 1 and hollow cylinders 2 and 3 is preferably only about 0.05 mm. wide so that the magnetic flux will not be appreciably reduced.

Although a rotor 21 comprised of a pair of hollow cylinders has been described and illustrated, it is within the scope of the present invention to vary the number of hollow hysteresis cylinders depending on the required properties and dimensions of the rotor. The yoke may, for example, be formed by a single hollow cylinder in which case, to facilitate assembly, the ventilating vanes 6 are formed at one frontal face or end, as described above, in the form of protrusions of the filler material 4, but on the other frontal face are molded onto the short-circuit ring 7 of the squirrel cage in the conventional manner. It is also possible, particularly when the iron in the motor is particularly long, to arrange three or more identical hollow hysteresis cylinders in the interior of the lamination packet 1. In this case, the filler material 4 of the hollow cylinders disposed at the rotor frontal faces or ends is constructed as shown in FIG. 2, whereas the inner hollow cylinders are filled with filler only in their interiors. Such an embodiment is particularly advantageous since the dimensions of the rotor can be varied according to the building block principle and it is thus possible to use substantially the same components and the same tools for manufacturing rotors of any desired length. The present invention can also be advantageously used to produce the rotor yoke for larger rotors, since the formation of the large rotor from a plurality of small hollow hysteresis cylinders tends to avoid the difficulties arising when large hollow cylinders are manufactured of hysteretic material, thereby tending to reduce the manufacturing costs thereof.

As can easily be seen from the above description, the present invention offers the advantage that the rotor exhibits all of the desired electrical properties and that its construction requires a very simple and relatively inexpensive manufacturing process.

It will be understood that the above description of the present invention is susceptible to various modifications, changes and adaptations, and the same are intended to be comprehended within the meaning and range of equivalents of the appended claims.

We claim:

1. In an electromotor of the hysteresis type having a rotor and a stator relatively mounted so as to define an air gap therebetween, the yoke of said rotor being comprised of hysteretic material and being enclosed, on the surface facing said air gap, by a lamination packet of layers of annular sheets of conventional dynamo sheet iron, which packet supports a squirrel cage formed at least partially therein, the improvement wherein said rotor yoke being formed from at least one hollow cylinder of hysteretic material, the interior of each of said cylinders being filled with a non-magnetic filler material having an axial bore to receive the shaft of said rotor, said cylinder being directly enclosed by said packet.

2. The electromotor defined in claim 1 wherein said rotor yoke is comprised of a plurality of said hollow cylinders, each of which is separately filled with said filler material.

3. The electromotor defined in claim 1 wherein said filler material is formed to provide protrusions which extend beyond the frontal face of said cylinder serving as the end of said rotor, and which serve as ventilation vanes.

4. The electromotor defined in claim 1 wherein blind bores are provided in the surface of said filler material serving as the end of said rotor for the purpose of retaining balancing weights therein.

5. The electromotor defined in claim 1 wherein the individual components of the rotor are fastened together by means of an adhesive.

6. The electromotor of claim 5 wherein all of the components of said rotor are fastened together by adhesive during the same assembly operation.

7. The electromotor defined in claim 1 wherein the inner surface of each of said hollow cylinders forming the rotor yoke is provided with at least one axial groove to aid in securing said filler material to said cylinders.

8. The electromotor defined in claim 7 wherein said axial grooves extend over only a portion of the length of said cylinders.

9. The electromotor defined in claim 1 wherein said lamination packet is provided with a plurality of radial grooves, each of said grooves being open both at the end thereof adjacent said air gap and at the end thereof adjacent said cylinder.

10. The electromotor defined in claim 1 wherein said filler material is an insulating material.

11. The electromotor defined in claim 1 wherein said filler material is a zinc alloy having a very low casting temperature.

12. The electromotor defined in claim 3 wherein the individual components of said rotor are fastened together by means of an adhesive; and wherein the inner surface of each of said hollow cylinders is provided with at least one axial groove for receiving said filler material.

References Cited
UNITED STATES PATENTS

| | | | |
|---|---|---|---|
| 3,068,373 | 12/1962 | Bekey | 310—162 |
| 3,153,161 | 10/1964 | Gabriel | 310—162 |

DAVID X. SLINEY, Primary Examiner

U.S. Cl. X.R.

310—162

UNITED STATES PATENT OFFICE
CERTIFICATE OF CORRECTION

Patent No. 3,561,833          Dated February 9th, 1971

Inventor(s) Heinz Heilmann and Klaus Frohmüller

It is certified that error appears in the above-identified patent and that said Letters Patent are hereby corrected as shown below:

In the heading of the patent, line 7, after "Germany, Nov. change "10" to --9--.

Signed and sealed this 15th day of June 1971.

(SEAL)
Attest:

EDWARD M. FLETCHER, JR.
Attesting Officer

WILLIAM E. SCHUYLER,
Commissioner of Paten